US009226120B2

(12) United States Patent
Allen et al.

(10) Patent No.: US 9,226,120 B2
(45) Date of Patent: *Dec. 29, 2015

(54) METHODS AND APPARATUS FOR PROVIDING PTT DATA BUFFERING SUPPORT INDICATIONS FROM MOBILE DEVICES AND PTT DATA BUFFERING CONTROL BY WIRELESS NETWORKS

(71) Applicant: BlackBerry Limited, Waterloo (CA)

(72) Inventors: Andrew Allen, Mundelein, IL (US); Xin Jin, Waterloo (CA); Wen Zhao, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 502 days.

This patent is subject to a terminal disclaimer.

(21) Appl. No.: 13/771,482

(22) Filed: Feb. 20, 2013

(65) Prior Publication Data

US 2013/0165173 A1  Jun. 27, 2013

Related U.S. Application Data

(63) Continuation of application No. 12/862,212, filed on Aug. 24, 2010, now Pat. No. 8,467,819, which is a continuation of application No. 11/483,122, filed on Jul. 7, 2006, now Pat. No. 7,813,747, which is a (Continued)

(51) Int. Cl.
*H04B 7/00* (2006.01)
*H04W 4/10* (2009.01)
*H04W 76/00* (2009.01)

(52) U.S. Cl.
CPC .............. *H04W 4/10* (2013.01); *H04W 76/005* (2013.01)

(58) Field of Classification Search
USPC ........................................................ 455/518
See application file for complete search history.

(56) References Cited

U.S. PATENT DOCUMENTS 6,516,200 B1   2/2003   Schmidt et al.
7,043,266 B2   5/2006   Chaturvedi et al.
(Continued)

FOREIGN PATENT DOCUMENTS

EP    1463346 A1    9/2004
WO    02093812 A2   11/2002
(Continued)

OTHER PUBLICATIONS

Extended European Search Report for EP Patent Application11151047.5, dated May 17, 2011, 8 pages.

(Continued)

*Primary Examiner* — Ankur Jain
(74) *Attorney, Agent, or Firm* — Fish & Richardson P.C.

(57) ABSTRACT

In one illustrative example, a technique in a mobile communication device which is operative in a wireless communication network for Push-To-Talk (PTT) communications involves receiving, at the mobile communication device, presence information associated with at least one other mobile communication device, the presence information including at least one of a current availability indication or capability indication; and buffering a PTT communication prior to its transmission from the mobile communication device based on the presence information. The current availability or capability indication may be an automatic answering indication or a media capability indication, as examples.

18 Claims, 10 Drawing Sheets

Related U.S. Application Data continuation-in-part of application No. 11/182,140, filed on Jul. 15, 2005, now Pat. No. 8,041,376.

(60) Provisional application No. 60/700,190, filed on Jul. 18, 2005.

(56) References Cited

U.S. PATENT DOCUMENTS

| | | | |
|---|---|---|---|
| 7,245,940 B2* | 7/2007 | Serbin | H04W 4/10 370/328 |
| 7,295,853 B2 | 11/2007 | Jin et al. | |
| 2002/0077136 A1* | 6/2002 | Maggenti | H04L 63/0428 455/518 |
| 2002/0173326 A1 | 11/2002 | Rosen et al. | |
| 2003/0148785 A1 | 8/2003 | Mangal et al. | |
| 2004/0005893 A1 | 1/2004 | Isobe et al. | |
| 2004/0057405 A1 | 3/2004 | Black | |
| 2005/0032538 A1 | 2/2005 | Noel et al. | |
| 2005/0032539 A1 | 2/2005 | Noel et al. | |
| 2005/0122923 A1 | 6/2005 | Jang et al. | |
| 2006/0003745 A1* | 1/2006 | Gogic | H04M 1/72547 455/413 |
| 2006/0063553 A1* | 3/2006 | Iyer | H04W 76/005 455/519 |
| 2006/0178138 A1 | 8/2006 | Ostroff et al. | |
| 2006/0223585 A1 | 10/2006 | Legg | |
| 2007/0275713 A1 | 11/2007 | Tidwell | |

FOREIGN PATENT DOCUMENTS

| | | |
|---|---|---|
| WO | 03100372 A1 | 12/2003 |
| WO | 2006044967 | 4/2006 |

OTHER PUBLICATIONS

Office Action for U.S. Appl. No. 11/483,122, dated May 19, 2009, 16 pages.
Office Action for U.S. Appl. No. 11/483,122, dated Feb. 22, 2010, 13 pages.
Notice of Allowance for U.S. Appl. No. 12/862,212, dated Feb. 19, 2013, 17 pages.
Office Action for U.S. Appl. No. 11/182,140, dated May 29, 2008, 13 pages.
Office Action for U.S. Appl. No. 11/182,140, dated Aug. 13, 2010, 16 pages.
Notice of Allowance for U.S. Appl. No. 11/182,140, dated Jun. 10, 2011, 12 pages.
International Search Report and Written Opinion in International Application No. PCT/CA2006/001107, mailed Oct. 24, 2006, 11 pages.
International Preliminary Report on Patentability in International Application No. PCT/CA2006/001107, mailed Jan. 24, 2008, 7 pages.
European Search Report for EP Patent Application 06752877.8, Oct. 21, 2008.
Office Action for U.S. Appl. No. 11/182,140, Jan. 29, 2009.
Office Action for U.S. Appl. No. 11/182,140, Jul. 10, 2009.
Notice of Allowance for U.S. Appl. No. 11/483,122, Jul. 7, 2006.

* cited by examiner

FIG. 1
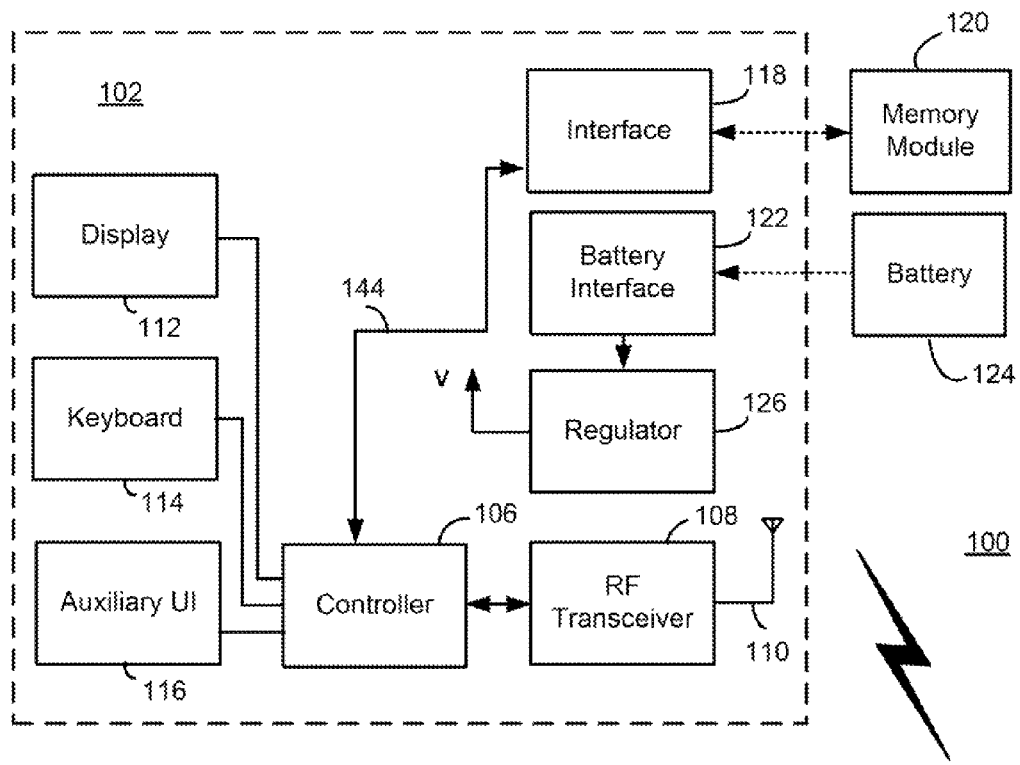
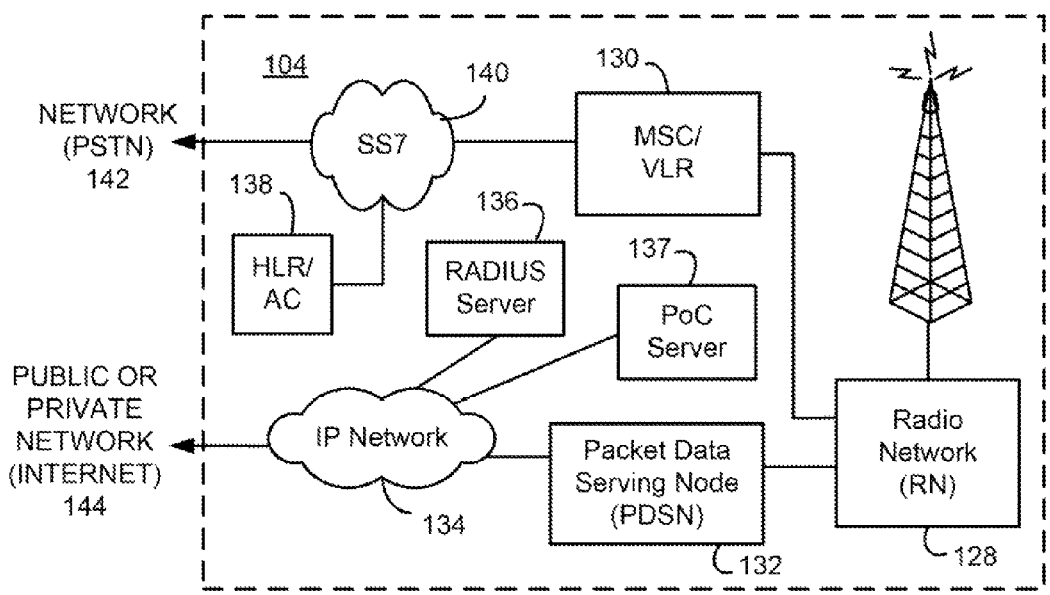

METHODS AND APPARATUS FOR PROVIDING PTT DATA BUFFERING SUPPORT INDICATIONS FROM MOBILE DEVICES AND PTT DATA BUFFERING CONTROL BY WIRELESS NETWORKS

CROSS-REFERENCE TO RELATED APPLICATIONS

The present application is a continuation of and claims priority to U.S. non-provisional patent application having application Ser. No. 12/862,212 and filing date of 24 Aug. 2010, now U.S. Pat. No. 8,467,819, which is a continuation of and claims priority to U.S. non-provisional patent application having application Ser. No. 11/483,122 and filing date of 7 Jul. 2006, now U.S. Pat. No. 7,813,747, which is a continuation-in-part of and claims priority to a U.S. non-provisional patent application having application Ser. No. 11/182,140 and filing date of 15 Jul. 2005, now U.S. Pat. No. 8,041,376, which also claims priority to U.S. provisional patent application having application No. 60/700,190 and filing date of 18 Jul. 2005, each application being incorporated by reference herein.

BACKGROUND

1. Field of the Technology

The present invention relates generally to Push-To-Talk (PTT) communications, and more particularly to methods and apparatus for providing PTT data buffering support indications from mobile devices and PTT data buffering control by wireless communication networks.

2. Description of the Related Art

A mobile communication device, such as a cellular telephone or mobile station, is capable of making and receiving voice calls and/or sending and receiving data over a wireless communication network. Recent developments have given such mobile stations the ability to communicate in "push-to-talk" (PTT) modes using Push-to-talk over Cellular (PoC) technology. PoC communication utilizes Voice-over-IP (VoIP) techniques which involve the communication of data packets carrying voice information.

PoC communication is adapted for one-to-one talks or group talks which are session-based. The end user of a mobile station may send an "invitation" for PoC communication to other potential "participants" who may "accept" or ignore the invitation. When an initiation is accepted, a PoC session is created between the two participants. Further acceptances of the invitation may expand the session into a group session having more than two participants.

In such networks, when the PTT switch is pressed at the mobile station, the end user is not able to immediately speak into the microphone. The end user must wait for some time delay period after the PTT switch depression in order to speak. This time delay period may be caused by physical radio channel setup, mobile paging, and PTT session setup activities. This delay is an inconvenience for end users in PTT communications, who may have to wait up to around eight seconds in some cases to talk after depressing the PTT switch.

In proposed Open Mobile Alliance (OMA) specifications, buffering in the network is specified to work-around the connection delay while the base station is paging the other party (or parties). However, no such technique is described for buffering at the handset to allow the origination party to talk immediately after PTT switch actuation. The following text is from the OMA standard that addresses the issue between the PoC Server and a terminating side "user B", which does not address the issue between an originating side "user A" and the PoC Server:

the PoC Server sends the final response after receiving the first auto-answer response from the terminating side and adds the Unconfirmed Indication to the final response. In this case the media buffering is supported and the Talk Burst confirm is sent after the first auto answer response is received. If buffering is not supported the Talk Burst confirm is sent after the first response to the invitation is received.

[if] a SIP 183 "Session Progress" response is received from the terminating side before a SIP 200 "OK" response is sent, PoC Server performing the Controlling PoC Function, sends a SIP 200 "OK" response to the PoC Client. In this flow the media buffering is supported and the TBCP Talk Burst Granted is sent after the SIP 183 "Session Progress" is received. If buffering is not supported the TBCP Talk Burst Granted is sent after the SIP 200 "OK" is received.

These above-described techniques relate to buffering in the network and do not address the time delay between PTT switch actuation of the handset and the time to begin talking. Note there is a gap in this is technique even for some of the user B's communications. The network only buffers media until the first user B is accepted, and the buffered media are sent to all users that accepted. Thus, some portion of the media data may be missed for users 2 to N.

For PTT communications, especially higher-bandwidth media communications (e.g. video), the network may be overburdened with the buffering needs of the many mobile stations operating in the network and the number of terminals supportable by the network is reduced significantly, which would result in significant additional infrastructure investment costs. If a mobile station were also provided with buffering for PTT communications, there are issues regarding control and coordination of buffering activities.

Accordingly, there is a resulting need for methods and apparatus for facilitating PTT communications with use of buffering that overcome the deficiencies of the prior art.

SUMMARY

In one illustrative example of the present disclosure, mobile communication device has one or more processors and a wireless transceiver adapted to provide communications through a wireless communication network. The one or more processors are operative to produce a mobile device indication message which indicates whether the mobile device supports buffering of Push-To-Talk (PTT) communications from the mobile device. This message is transmitted by the wireless transceiver to a PTT service entity through the wireless network. The one or more processors may be further operative to receive, from the PTT service entity through the wireless network, a network indication message which instructs the mobile device whether to use buffering for the PTT communications from the mobile device (assuming a buffer memory for PTT buffering is available in the mobile device). The mobile device may use the buffer memory for the buffering of the PTT communication based on the network indication message from the PTT service entity.

BRIEF DESCRIPTION OF THE DRAWINGS

Embodiments of present invention will now be described by way of example with reference to attached figures, wherein:

FIG. 1 is a block diagram which illustrates pertinent components of a mobile station and a wireless communication network, using a cdma200 wireless network as an example;

DETAILED DESCRIPTION OF THE PREFERRED EMBODIMENTS

Figure 2:
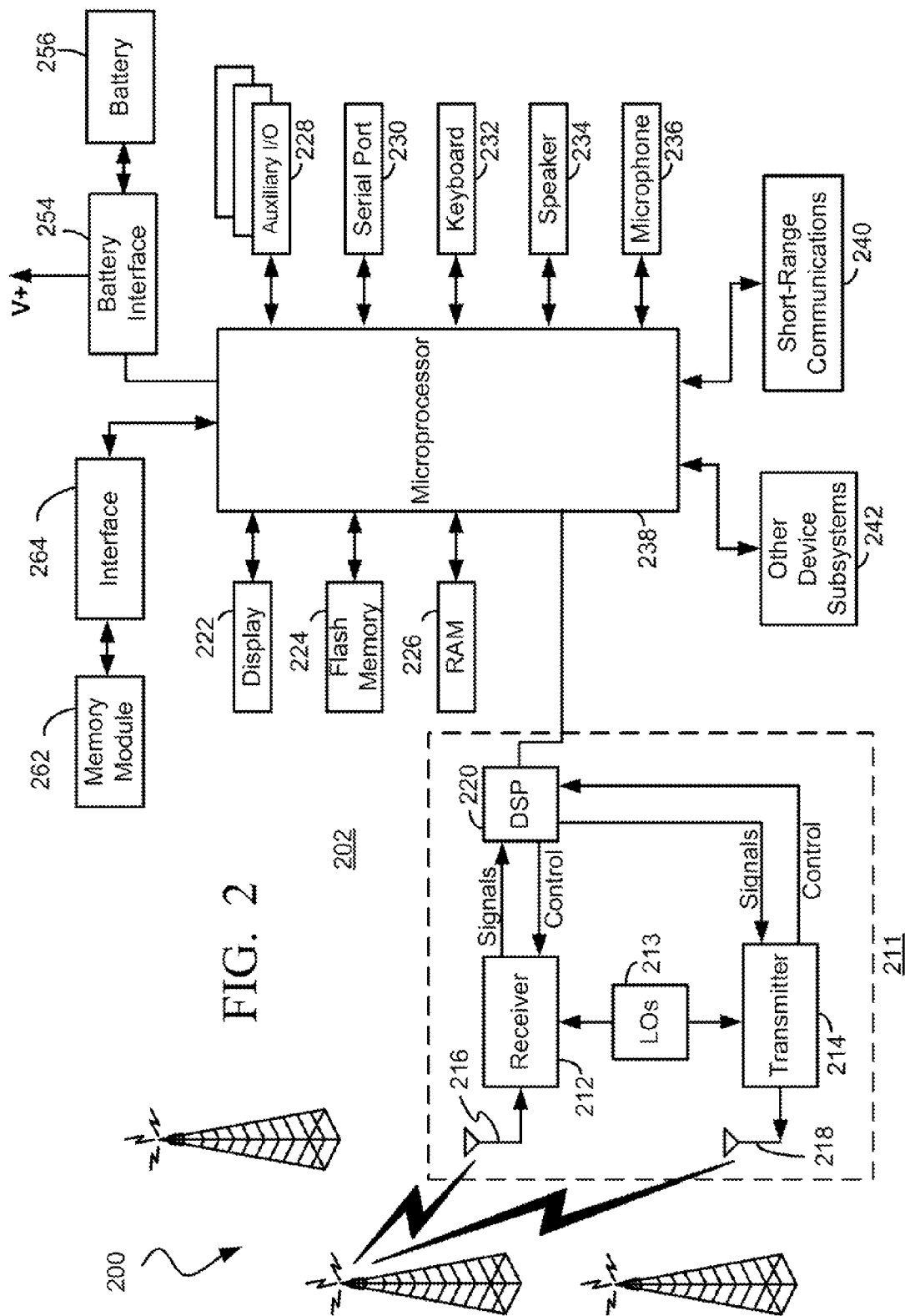
FIG. 2 is a more detailed diagram of a preferred mobile station of FIG. 1.

In one illustrative example of the present disclosure, a mobile communication device has one or more processors and a wireless transceiver adapted to provide communications through a wireless communication network. The one or more processors are operative to produce a mobile device indication message which indicates whether the mobile device supports buffering of Push-To-Talk (PTT) communications from the mobile device. This message is transmitted by the wireless transceiver to a PTT service entity through the wireless network. The one or more processors may be further operative to receive, from the PTT service entity through the wireless network, a network indication message which instructs the mobile device whether to use buffering for the PTT communications from the mobile device (assuming a buffer memory for PTT buffering is available in the mobile device). The mobile device may use the buffer memory for the buffering of the PTT communication based on the network indication message from the PTT service entity.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM), a UMTS Subscriber Identity Module (USIM), an IMS Subscriber Identity Module (ISIM), a Removable User Identity Module (R-UIM), which is connected to or inserted in mobile station 102 at an interface 118. As an alternative to a SIM or an USIM or an ISIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104, which is preferably a cellular telecommunications network. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IF network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

Although the embodiment described relates to one or more specific network technologies, any suitable network may provide the environment for the techniques for the present disclosure. For example, the Internet and/or other public, private, corporate IP networks, PSTN telephone networks, wireless local area networks (WLANs) (e.g. IEEE 802.11 or IEEE 802.16 among others), other cellular technologies such as Global Systems For Mobile Communications (GSM) or Universal Mobile Telecommunications System (UMTS) and General Packet Radio Service (GPRS) technologies, may or may not be utilized in connection with the present techniques.

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. Although a CDMA network has been described as the environment, other suitable networks may be utilized, such as Global System for Mobile communications (GSM), Universal Mobile Telecommunications System (UMTS), end General Packet Radio Service (GPRS) network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with, as will be described in more detail is later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card, a USIM, or an ISIM or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes PTT buffering indication techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
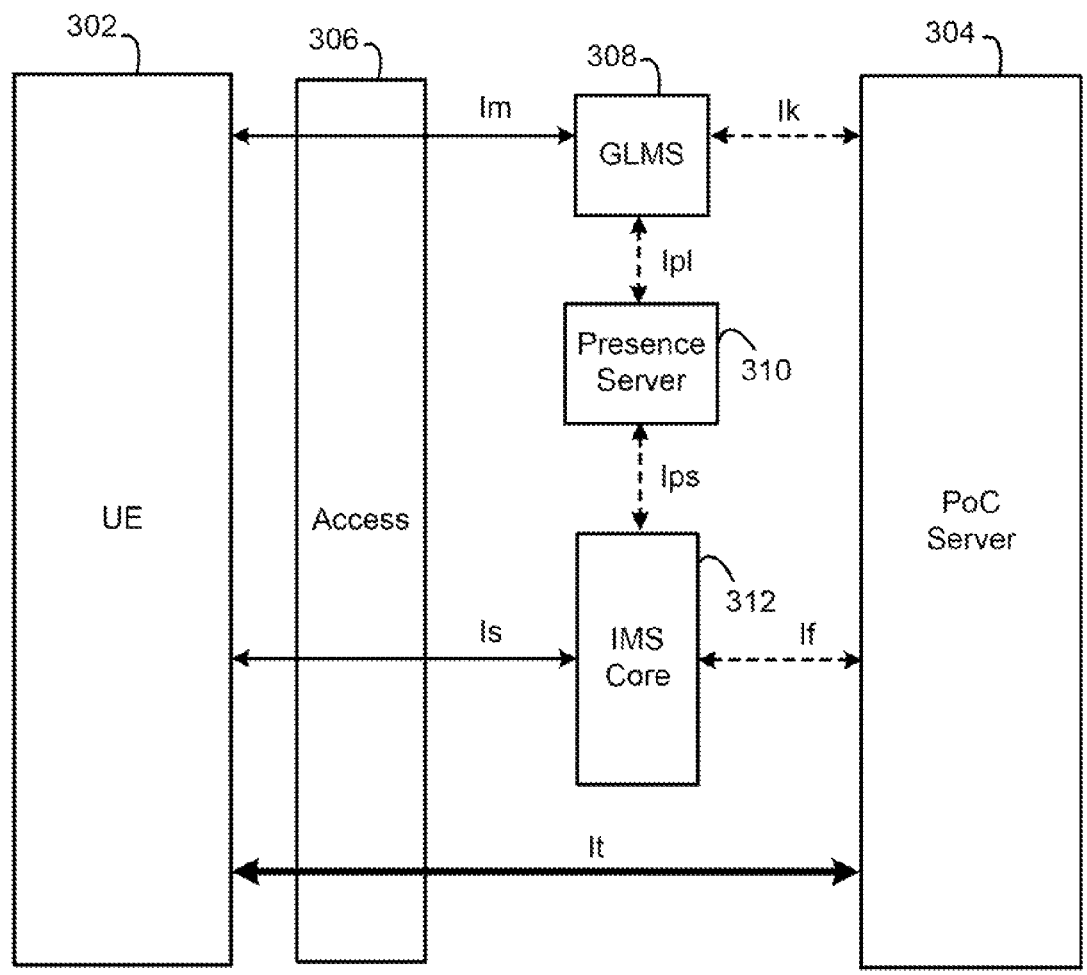
FIG. 3 is a block diagram of system components pertaining to PoC communication sessions.

FIG. 3 is a block diagram of relevant system components 300 pertaining to Push-to-talk over Cellular (PoC) communications, which may be utilized for the present techniques described herein. System components 300 include user equipment (UE) 302 which represents a mobile station, a Push-to-talk over Cellular (PoC) server 304, an access network 306, a Group and List Management Server (GLMS) 308, an IP Multimedia Subsystem (IMS) core 312, and a presence server 310. Some of these components may be optional or not necessary for fundamental operation.

A PoC communication session is a session connection between end users of a UE 302, referred to as session "participants", who may communicate one at a time in a half-duplex manner. PoC communication may utilize, for example, Voice over IP (VoIP) technology which involves the communication of data packets carrying voice information. UE 302 is terminal equipment (e.g. a mobile station) which includes PoC application client software, which includes functionality of the present disclosure but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list is a type of address book that may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups. An end user may select one group from the list to initiate an instant group talk session or a chat group talk session, depending on the type of group. An access list is used by the end user as a means of controlling who is allowed to initiate instant talk sessions to the end user. An access list contains end user defined identities of other end users or groups. The end user may have one blocked identities list and one granted identities list.

PoC server 304 includes functionality to perform the PoC service. PoC Server 304 typically performs functions such as (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak/transmit media data); (9) talker identification; (10) participant information; (10) quality feedback; (11) charging reports; and (12) media distribution. Presence server 310 manages presence information that is uploaded by presence user/network/external agents, and is responsible for combining the presence-related information for a certain presentity from the information it receives from multiple sources into a single presence document. The presence information may be used by a PTT terminal to determine the availability and willingness of other PTT terminals to be included in a PTT session, what types of media they will accept, and also whether or not they will answer automatically.

An Is interface supports the communication between UE 302 and IMS core 312. This communication includes SIP procedures which support the PoC features. The protocol for the Is interface is Session Initiation Protocol (SIP). Is signaling is transported on User Datagram Protocol (UDP). The protocols over an If interface support the communication between IMS core 312 and PoC server 304 for session control. The protocols over an It interface support the transport of talk bursts, floor control, and link quality messages between. UE 302 and PoC Server 304. The protocols over an Im interface support the communication between UE 302 and GLMS 308 for the purpose of managing the groups, contact lists and access lists and Do-not-Disturb indication. HTTP/XML protocols are utilized for these purposes. The protocols over an Ik interface support the communication between. PoC Server 304 and GLMS 308, enabling PoC server 304 to retrieve the groups and access lists from GLMS 308. The protocols over an Ips interface enable the uploading of the registration status from IMS core 312 to presence server 310 and the dissemination of the presence information between presence server 310 and UE 302. The protocol over an Ipl interface enables the uploading of Do-not-Disturb status and granted/blocked access lists from GLMS 308 to presence server 310. The group identity used on the Is interface between the UE and IMS core for group talk is generated by GLMS 308.

Each entity in the PoC system is assigned one or more IP addresses belonging to public or private IP realms. On the other hand, an end user may address another user by a phone number. UE 302 sends a phone number to IMS core 312 in a TEL Uniform Resource Locator (URL). The phone number may use the international E.164 format (prefixed with a '+' sign) or a local format using a local dialing plan and prefix. IMS core 312 interprets the phone number with a leading '+' to be an E.164 number. Addressing by TEL URL for a PoC session requires that PoC Server 304 can resolve the TEL URL to a SIP URI, for instance by using DNS/ENUM or other local data base. A phone number in a local format is converted to the E.164 format before DNS/ENUM is used.

End users may initiate PoC talk sessions. An INVITE request on the Is interface contains an "Accept-Contact" header with a media feature tag indicating the PoC service. IMS core 312 is able to identify the request as a PoC communication by inspecting the Accept-Contact header. A Request-URI of the INVITE contains either the pre-configured ad-hoc identity (for instant personal talk and ad-hoc instant group) or a group identity (for instant group talk or chat group talk). Early session establishment is used for having a session available for quick connection establishment using "REFER". The early session establishment's INVITE does not have any referred party field and can be differentiated from this against other INVITEs. A transient group identity is generated by PoC server 304 and distributed to UE 302 in the "Contact" header. From an initiating UE 302, the public user identity of the inviting user is included in the "From" header. On the signaling towards the invited user, the "From" header includes either the public user identity (instant personal talk, ad-hoc instant group) or the group identity (instant group talk or being added to a chat group).

Figure 11:
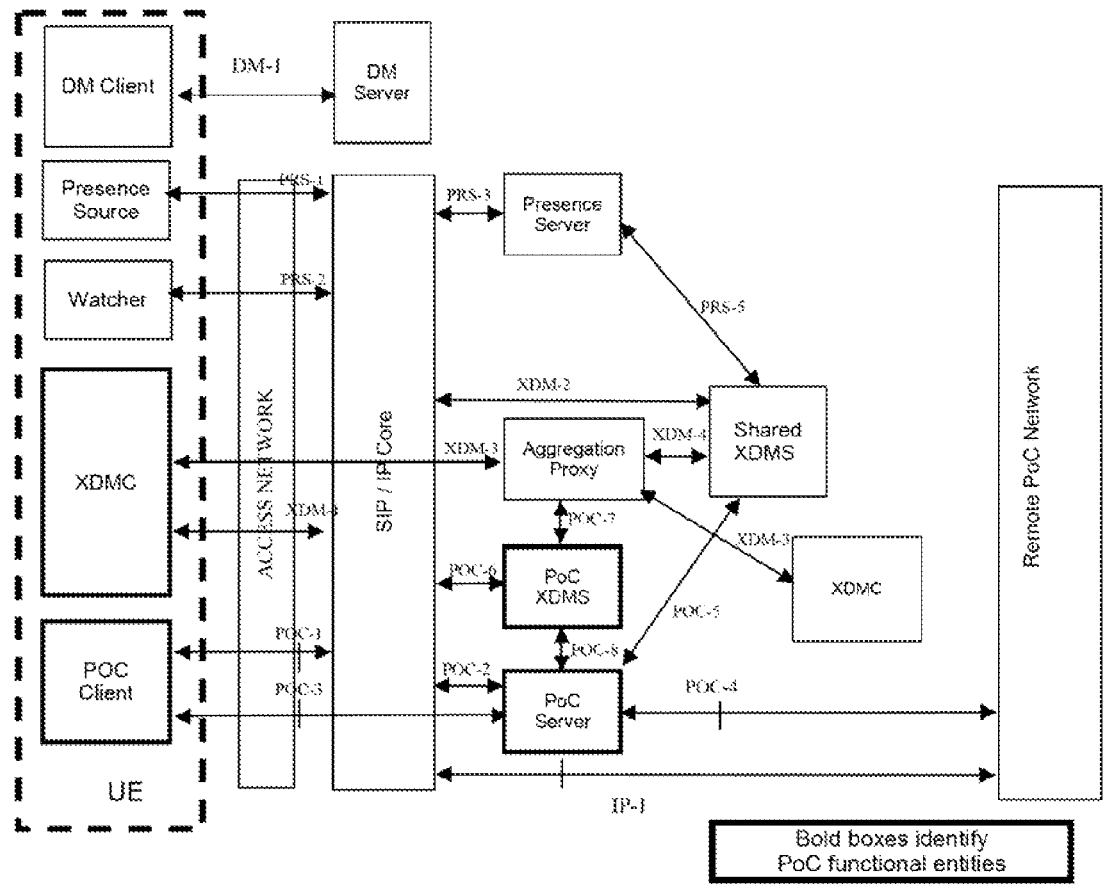
FIG. 11 is a block diagram of the Open Mobile Alliance (OMA) PoC architectural implementation based on the functional architecture shown in FIG. 3.

Other than the inventive techniques described herein, the PoC architecture and signaling may be the same as is conventional as described in current standard specifications such as Push-to-talk over Cellular (PoC), Architecture, PoC Release 1.0—Architecture V1.1.0 (2003-08) Technical Specification; Push-to-talk over Cellular (PoC), Signaling Flows, PoC Release 1.0—Signaling Flows V1.1.3 (2003-08) Technical Specification, OMA Push-to-talk over Cellular—Architecture Candidate Version 1.0-28 Apr. 2005, and OMA PoC Control Plane Candidate Version 1.0-28 Apr. 2005. Other architectures and techniques are possible. Although the PoC architecture and signaling has been provided as the exemplary environment for the techniques of the present disclosure, any suitable network for PTT voice communications may be utilized. For example, FIG. 11 is a block diagram of the Open Mobile Alliance (OMA) PoC architectural implementation based on the functional architecture shown in FIG. 3. In this implementation, the GLMS is decomposed into several XML document management servers (XDMS) and an aggregation proxy which perform the same functions as the GLMS. The UE is also shown as being functionally decomposed into separate subfunctions such as a PoC Client, an XDMC (i.e. XML document management Client), a Presence Source, and a Watcher. The IMS core is labeled as a SIP/IP Core. Again, the techniques of the present disclosure are applicable to this architecture even though the specific functional decomposition of the functions may be different.

Figure 4:
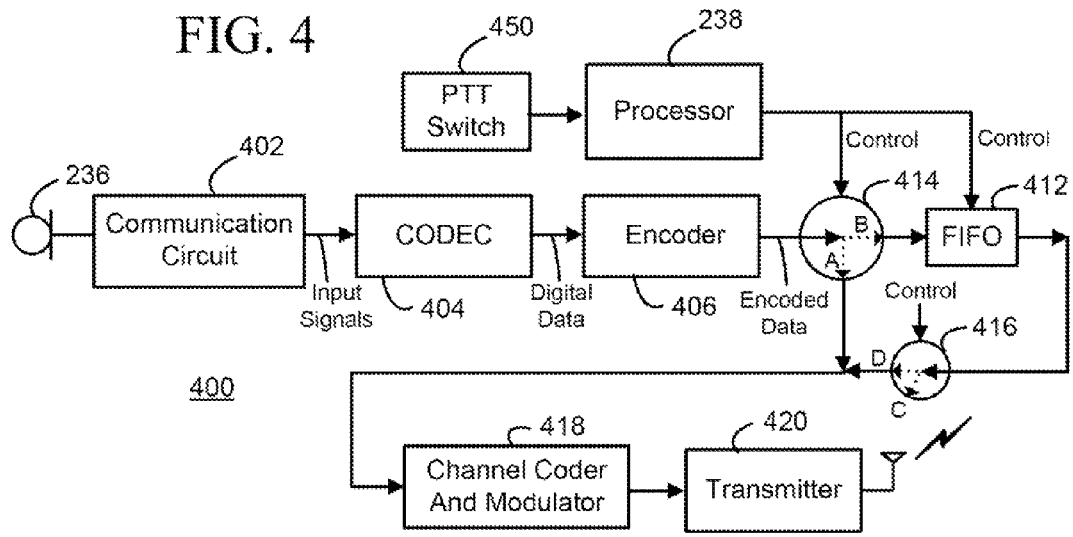
FIG. 4 is a schematic block diagram of pertinent electrical components for the immediate receipt and queuing of data for PTT communications in the mobile station of FIGS. 1-2.

Referring now to FIG. 4, as one illustrative example, a schematic block diagram of pertinent electrical components 400 of the mobile station of FIGS. 1-2 for PTT data buffering and the immediate receipt and queuing of PTT data for PTT communications is shown. The schematic block diagram of FIG. 4 includes microphone 236, a communication circuit 402 (e.g. a microphone circuit), a coder/decoder (CODEC) 404, an encoder 406 for compression, a switch 414, a first-in-first-out (FIFO) buffer memory 412, a switch 416, a channel coder and modulator 418, a transmitter 420 (including transmitter PA), a PTT communication switch in 450, and microprocessor 238. Although FIG. 4 relates to PTT voice communications, a PTT communication may involve any suitable PTT media type, such as video, or video plus audio (e.g. for videoconferencing), etc.

Microphone 236 has an output coupled to communication circuit 402 which includes circuitry for biasing and filtering analog voice signals from microphone 236 and for controlling the on/off state of microphone 236. An output of communication circuit 402 is coupled to an input of CODEC 404, which may include conventional voice processing circuits such as one or more amplifiers, one or more filters, an automatic gain control (AGC) circuit, and an analog-to-digital (A/D) converter, and optionally a nonlinear compender such as an A-law compender. Thus, CODEC 404 converts the analog signals (e.g. analog voice signals) into digital data and has an output that provides the digital data. In particular, the signal may be a pulse-coded modulated (PCM) signal. The output from CODEC 404 is coupled to an input of encoder 406, which is an encoder that operates to compress and reduce the data rate of the PCM data for transmission without an unacceptable degradation of quality at the receiving end. An output of encoder 406, which provides the encoded data, is coupled to an input of switch 414. Note that the date rate at the output of encoder 406 (e.g. 8 kbps for voice) is substantially lower than the data rate at the output of CODEC 404 (e.g. 64 kbps).

A first output of switch 414 is coupled to an input of FIFO buffer memory 412, and a second output of switch 414 is coupled to an input of channel coder and modulator 418. An output of FIFO buffer memory 412 is also coupled to the input of channel coder and modulator 418 through switch 416. Channel coder and modulator 418 provide for forward error correcting and/or error detecting, and transforming the signal into a form that is suitable for transmission over the radio frequency (RF) channel. For example, channel coder and modulator 418 may be a combination of a convolutional encoder, a spread spectrum spreader, and a QPSK modulator. Transmitter 420, which includes at least a frequency upconverter and a power amplifier (PA) (not shown in FIG. 4), is coupled to the antenna for the transmission of voice data to the wireless network.

Processor 238 has an output which controls the position of switches 414 and 416. Depending on the switch position, switch 414 will route encoded voice data from encoder 406 to either channel coder and modulator 418 for transmission to the wireless network (switch position "A"), or to FIFO buffer memory 412 for storage of the encoded data (switch position "B"). Processor 238 controls switch 414 to be in switch position B when buffering is needed for PTT voice communications; otherwise the processor controls switch 414 to be in switch position A for ordinary communications (e.g. telephone voice calls). Processor 238 controls switch 416 to be in a switch position "D" when buffered voice data for PTT voice communications is being transmitted to the wireless network; otherwise the processor controls switch 416 to be in a switch position "C" for normal voice communications (e.g. cellular telephone voice calls).

In an alternative configuration, encoder 406 of FIG. 4 is relocated in the circuit and coupled directly in line with channel coder and modulator 418 (after the paths of switches 414 and 416), such that the output of CODEC 404 is coupled directly to the input of switch 414. This alternative is workable, albeit slightly less desirable as a larger amount of memory space would be required for FIFO buffer memory 412.

Figure 5:
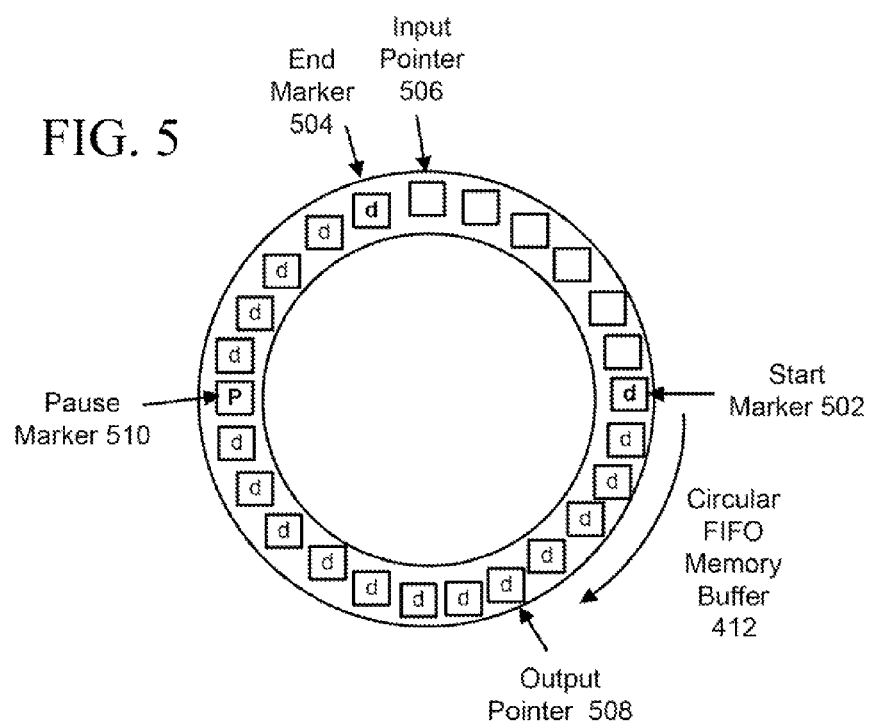
FIG. 5 is an illustrative representation of a first-in-first-out (FIFO) buffer memory of the schematic block diagram of FIG. 4.

FIG. 5 is an illustrative representation of FIFO buffer memory 412 of the schematic block diagram of FIG. 4. FIFO buffer memory 412 may be any suitable memory that alone, or in combination with other circuitry, permits reconstruction of recorded communication data (e.g. voice data) in its proper order. As illustrated, FIFO buffer memory 412 which stores the media data is a circular buffer memory. Each square in FIG. 5 represents a separate memory location or block which is separately addressable. Using circular buffering, the communication data are saved in a consecutive fashion in FIFO buffer memory 412 such that "older" communication data is written over by "newer" media data in a loop-type fashion. The size of FIFO buffer memory 412 is sufficient to buffer an amount of communication data based on the data rate and the time delay period for PTT setup. Given a worst case delay time period of 8 seconds for a PTT setup and a maximum data rate of 8 kilobits per second (kbps) for voice, for example, FIFO buffer memory 412 may have a minimum size of about 64 kbits. When the buffer is used for buffering other media types such as video, the required size will be dependent on the media data rate and the required buffering time.

A pair of start and end markers 502 and 504 for FIFO buffer memory 412 typically define the boundaries of a single previously-saved PTT communication for transmission from the mobile station. Start marker 502 is used to identify a beginning of the PTT communication, and an end marker 504 is used to identify the end of the PTT communication. Start and end markers 502 and 504 may be in the form of address pointers stored in another portion of memory which "point" to the appropriate location in FIFO buffer memory. Thus, start marker 502 is a pointer address corresponding to a memory location of the beginning of the PTT voice communication, and end marker 504 is a pointer address corresponding to a memory location of an end of the PTT communication.

Also in FIG. 5, an input pointer 506 to FIFO buffer memory 412 identifies a next available memory location for saving PTT data for a PTT voice communication. On the other hand, an output pointer 508 identifies the next available memory location corresponding to the PTT data of the PTT communication to be processed and transmitted from the mobile station. Input and output pointers 506 and 508 may be stored in another portion of memory to "point" to the appropriate location within FIFO buffer memory 412. When PTT data is being input and output from FIFO buffer memory 412, input and output pointers 506 and 508 are incremented (or decremented) accordingly to appropriately read in and write out the PTT data. Note that a pause marker 510 may be used to provide pausing or "silent" or "blank" data between separate PTT communications under certain conditions, as will be described later below.

During PTT buffering, the components of FIGS. 4-5 are used such that PTT data corresponding to input signals are accepted from the microphone and queued in the FIFO buffer memory immediately after a PTT switch actuation. Thus, the end user does not need to wait any substantial delay period to talk after PTT switch actuation. PTT data is continuously received and stored in the FIFO buffer memory and, when PTT setup procedures are complete, the saved PTT data is suitably output from the FIFO and transmitted to the wireless network. During the transmission of PTT data from the FIFO, new PTT data corresponding to new input signals are continuously received and stored in the FIFO to replace (i.e. rewrite over) used PTT data in the FIFO.

Figure 6:
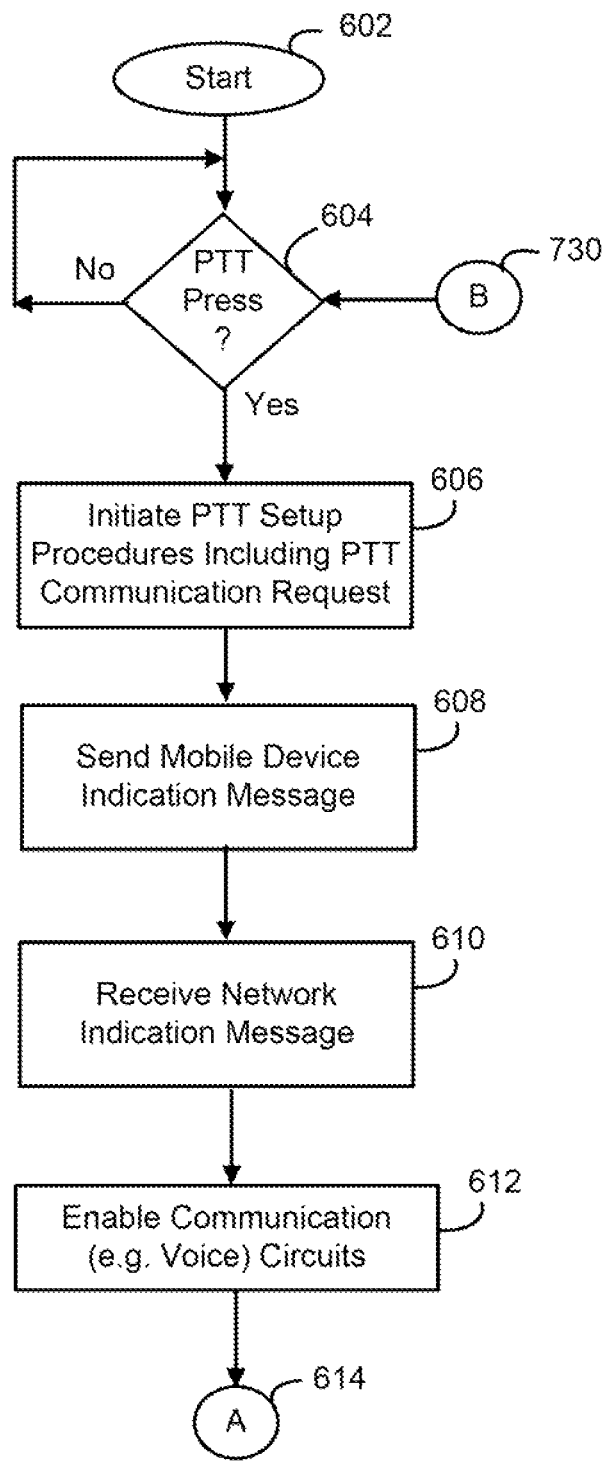
FIGS. 6-7 form a flowchart relating to a method for PTT buffering the immediate receipt and queuing of audio and/or video data for PTT communications.
Figure 7:
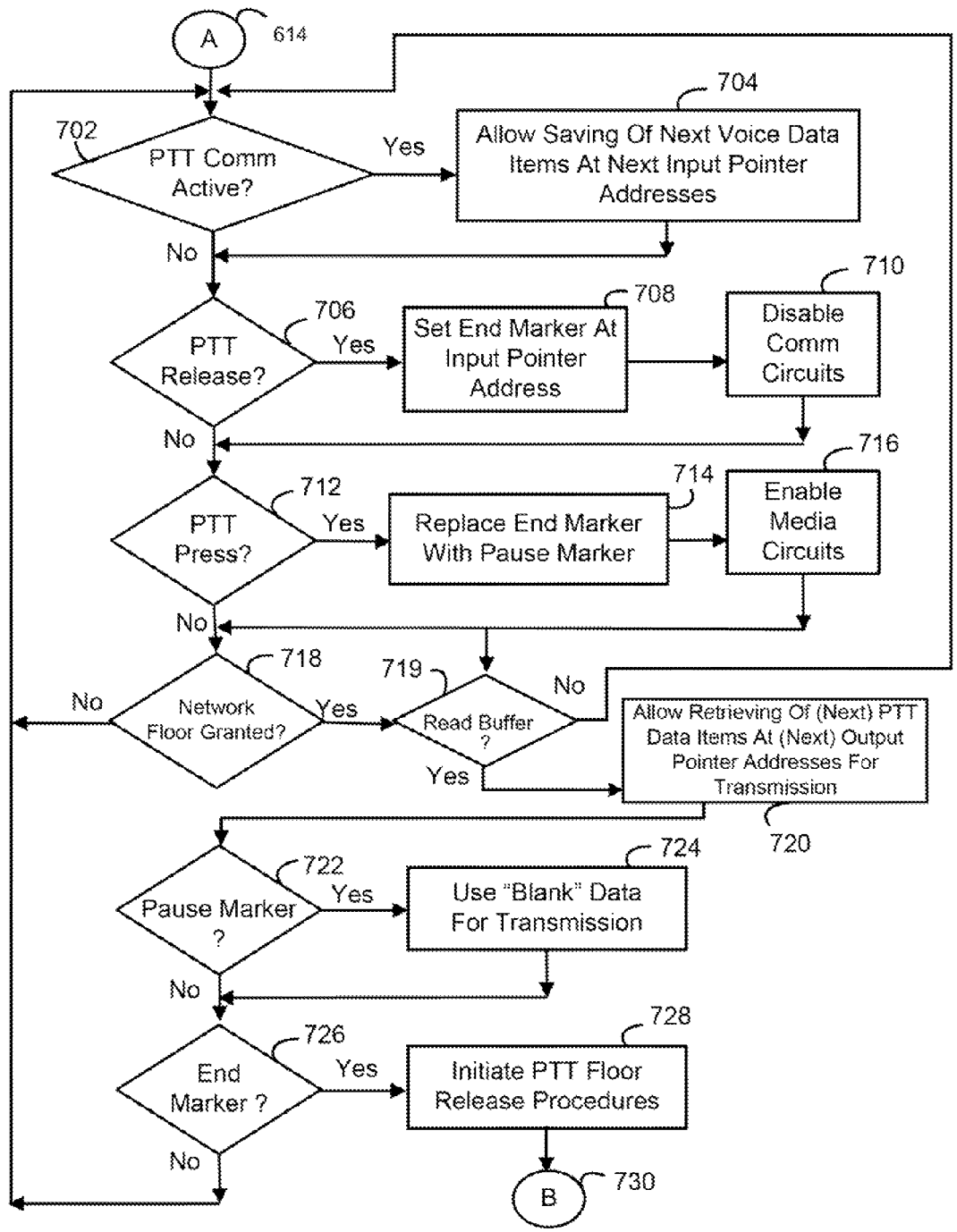

FIGS. 6-7 form a flowchart which describes a more detailed method for PTT buffering in one type of buffering mode for PTT communications. The different types of buffering modes of the mobile station will be described later below. This method is performed by a mobile station within the context described above in relation to FIGS. 1-5. In addition, the method may be embodied in a computer program product which includes a storage medium (e.g. computer disk or memory) and computer instructions stored in the storage medium. These computer instructions are performed by one or more processors of the mobile station (e.g. microprocessor, DSP, etc.). In the description that follows, the flowchart of FIG. 6 will be described in combination with the components of FIGS. 4-5. Note that although the method of FIGS. 6-7 relates to PTT voice communications, a PTT communication may involve any suitable PTT media type, such as video, or video plus audio (e.g. for videoconferencing), etc.

Beginning at a start block 602 of FIG. 6, a processor of the mobile station detects whether a PTT switch has been depressed by the end user (step 604 of FIG. 6). If not, the processor continues to monitor for switch actuations. If the PTT switch has been depressed at step 604, the processor causes P setup procedures to be initiated such that a PTT communication may be made by the end user (step 606 of FIG. 6). The PTT setup procedures include accessing the network, establishing a traffic channel, and sending a PTT communication request through the wireless communication network. Ordinarily, in response to the PTT setup procedures, a permission is granted for the PTT communication. These procedures normally take some amount of time to complete. For example, in some networks it may take a few seconds to receive permission or acceptance from the network and establish the channel for PTT voice communication with the network.

Next, the processor sends a mobile device indication message to the network which indicates whether support exists for PTT buffering (step 608 of FIG. 6). The process then receives a network indication message which controls whether and/or how PTT buffering should be utilized in the mobile station (step 610 of FIG. 6). Subsequent processing assumes that PTT buffering is allowed. If PTT buffering is allowed by the network indication message, the processor causes communication circuits of the mobile station to be enabled (step 612 of FIG. 6), assuming they are disabled.

The enabling in step 612 of FIG. 6 may include the enabling of communication circuit 402, CODEC 404, encoder 406, and FIFO buffer memory 412 of FIG. 4. Switch 414 of FIG. 4 is set to the position B so that digital data from the output of encoder 406 may be routed to FIFO buffer memory 412 (and not directly to channel coder and modulator 408). The processor initiates the saving of data items of received input signals from the microphone in the FIFO buffer memory, beginning at a start marker which is set at a location in the memory (for example, see start marker 502 of FIG. 5). Thus, switch 414 is positioned so that encoded data corresponding to input signals from microphone 402 may be accepted and queued in FIFO buffer memory 412 immediately after the network indication message is received (i.e. step 610) which indicates mobile station buffering without regard to network delays for connecting to the callee(s). The flowchart of FIG. 6 is continued through a connector A 614 to FIG. 7.

Note that, although the following steps in FIG. 7 are described as being performed sequentially in the flowchart, functions may be performed independently and as parallel processes, such as the recording of data in and reading of data from the memory. From the connector A 614 of FIG. 7, the processor identifies whether input signals of a PTT communication are being received at the user interface of the mobile station (step 702 of FIG. 7). Step 702 may be performed by checking whether the communication circuits are enabled (i.e. if enabled, then input signals are being received), whether the actuation state of the PTT switch is depressed (i.e. if in depressed state, then the input signals are being received), or testing a bit flag, as examples. If input signals of the PTT communication are being received at the user interface at step 702, then the processor allows saving of the next PTT data items of the received input signals in the FIFO buffer memory at the next input pointer addresses (step 704 of FIG. 7). Preferably, encoded data items from the encoder are stored in the FIFO buffer memory to conserve memory space.

The processor then identifies whether a PTT release has been detected at the user interface (step 706 of FIG. 7). If the PTT release is detected at step 706, then the processor causes an end marker which points to the current input pointer address to be saved (step 708 of FIG. 7). In combination with the start marker, the end marker defines the boundaries of the voice data for the PTT communication. See start and end markers 502 and 504 of FIG. 5. Next, the processor causes at least some of the communication circuits to be disabled (step 710 of FIG. 7). This may include disabling of communication circuit 402, CODEC 404, and encoder 406. Note that PTT release procedures are not yet initiated, but rather suspended by the mobile station, as buffered data of the PTT communication still exists in FIFO buffer memory 412 for transmission.

The processor then identifies whether a new PTT press has been detected at the user interface (step 712 of FIG. 7). Such a PTT press may occur some time after a PTT release has been detected, but before all of the buffered data of the PTT communication has been transmitted. Such press detection will not occur unless a PTT release has previously been detected at step 706 and an end marker has been set. If the PTT press is detected at step 712, then the processor causes the end marker (previously set in response to a detected PTT release) to be replaced with a pause marker (step 714 of FIG. 7). The processor also causes the communication circuits to be enabled (step 716 of FIG. 7) as the end user has chosen to continue talking from the new PTT press.

Next, the processor identifies whether a network floor is granted (step 718 of FIG. 7). If a network floor is granted in step 718, the processor further checks whether PTT buffered data should start to be read out from the buffer for transmission based on a current or previous indication received from a network indication message from the PTT service entity (step 719 of FIG. 7). If not, then the processor does not yet cause any of the stored data to be transmitted from the mobile station and the method repeats starting again with step 702. If the PTT buffered data should be read out for transmission at step 719, the processor allows the retrieving of the (next) data items of the PTT communication at the (next) output pointer addresses from the FIFO buffer memory for transmission (step 720 of FIG. 7). In FIG. 5, the transmission of the next data items to the wireless network occurs from an output of FIFO buffer memory 412 through switch 416, channel coder and modulator 418, transmitter 420, and the antenna.

Continuing with FIG. 7, the processor then identifies whether a pause marker is contained at the current output pointer address of the FIFO buffer memory (step 722 of FIG. 7). If a pause marker is encountered, this means that the end user had previously released the PTT switch and re-pressed it shortly thereafter (before completion of PTT release procedures) to talk further. See pause marker 510 of FIG. 5. If a pause marker is identified at step 722, the processor causes a pause or "silent" or "blank" data to be inserted into the PTT transmission. This serves to simulate an actual pause time that occurred between the first PTT communication and the second or follow-up PTT communication by the end user. Any suitable technique over any suitable timeframe may be used to provide this pause simulation. For example, blank data corresponding to a relatively short time period may be stored in memory and output into the data stream.

The processor then identifies whether an end marker is contained at the current output pointer address of the FIFO buffer memory (step 726 of FIG. 7). If an end marker is encountered, this signifies the end of the PTT transmission which occurs some time after release of the PTT switch by the end user. As stated earlier, the end marker in combination with the start marker defines the boundaries of the data for the PTT communication. See start and end markers 502 and 504 of FIG. 5. In response to identifying the end marker at step 726, the processor initiates PTT floor release procedures with the wireless network (step 728 of FIG. 7). The method continues through a connector B 730 back to FIG. 6.

Thus, during PTT buffering for voice, voice data corresponding to voice signals are accepted from the microphone and queued in FIFO buffer memory immediately after the network indication message is received and it indicates enabling of mobile station buffering. During the transmission of FIFO voice data, new voice data corresponding to new voice signals are continuously received and stored in the FIFO to replace the old voice data, during the continuous transmission of previously stored voice data. Preferably, encoded voice data is stored in the FIFO buffer memory to conserve memory space. Note that special cases may also be handled with the buffering techniques, where the end user presses the PTT switch soon after its release during voice data transmission. Here, the insertion of pauses between separate PTT voice communications helps simulate the actual voice communications made by the end user, and the radio channel stays active during the short voice gap without being released and re-established. The process of handling short releases of the PTT switch may occur one or more times during a single PTT radio transmission.

Thus, in one illustrative example, a mobile station includes a wireless transceiver; a user interface including a Push-To-Talk (PTT) switch for initiating a PTT communication and a communication circuit for receiving input signals; one or more processors; and a First-In-First-Out (FIFO) buffer memory coupled to the one or more processors. For PTT buffering, the one or more processors are operative to identify a user actuation of the PTT switch and, in response, cause a request for the PTT communication to be made through a wireless network; cause a mobile device indication message to be sent to the PTT network indicating whether or not mobile media buffering is supported; receive a network indication message to indicate whether and/or how the PTT network intends the mobile device should perform the buffering; if mobile device buffering is indicated by the network indication message, save digital media data corresponding to input signals in the FIFO buffer memory; identify that a floor grant has been received through the wireless network in response to the request; and after identifying the floor grant, identify whether buffer reading should start and, if buffer reading should start, cause the digital data from the FIFO buffer memory to be transmitted to the wireless network for the PTT voice communication. The circuitry may include a coder/decoder (CODEC) having an input coupled to receive input signals; an encoder having an input coupled to an output of the CODEC; the FIFO buffer memory having an input for coupling to an output of the CODEC; a switch coupled between the output of the encoder and an input to the FIFO buffer memory; where the one or more processors are operative to control the switch so as to route the encoded data to the input to the FIFO buffer memory for the PTT voice communication. Alternatively, the circuitry may include a CODEC having an input coupled to the microphone and an output which provides for voice data; the FIFO buffer memory having an input for receiving the data from the CODEC; a switch coupled between the output of the CODEC and the input to the FIFO buffer memory; where the one or more processors are operative to control the switch so as to route the data to the input to the FIFO buffer memory for the PTT communication.

Figure 8:
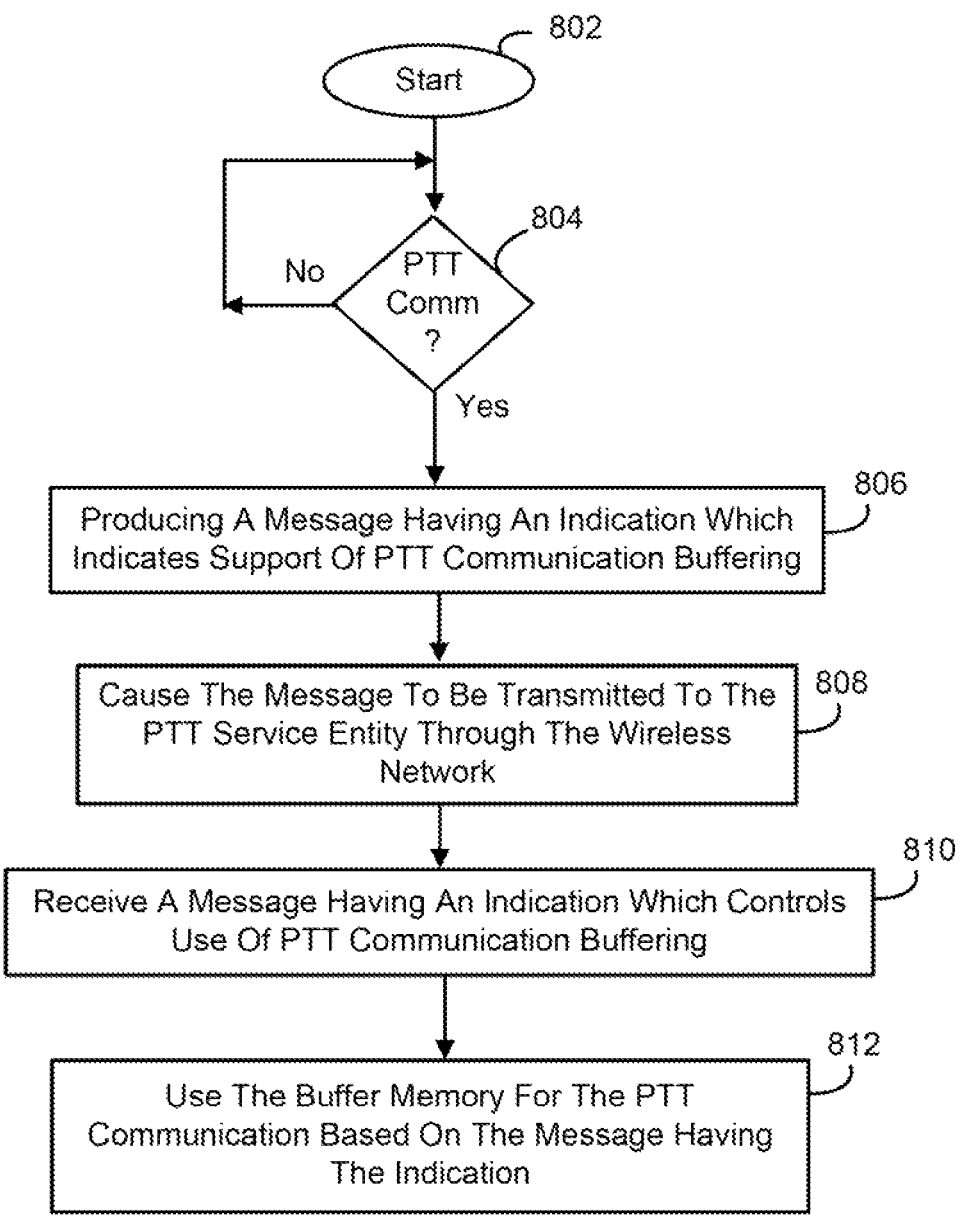
FIGS. 8-9 are flowcharts relating methods of providing PTT buffering support indications from mobile stations and PTT buffering control indications to mobile stations from wireless communication networks.
Figure 9:
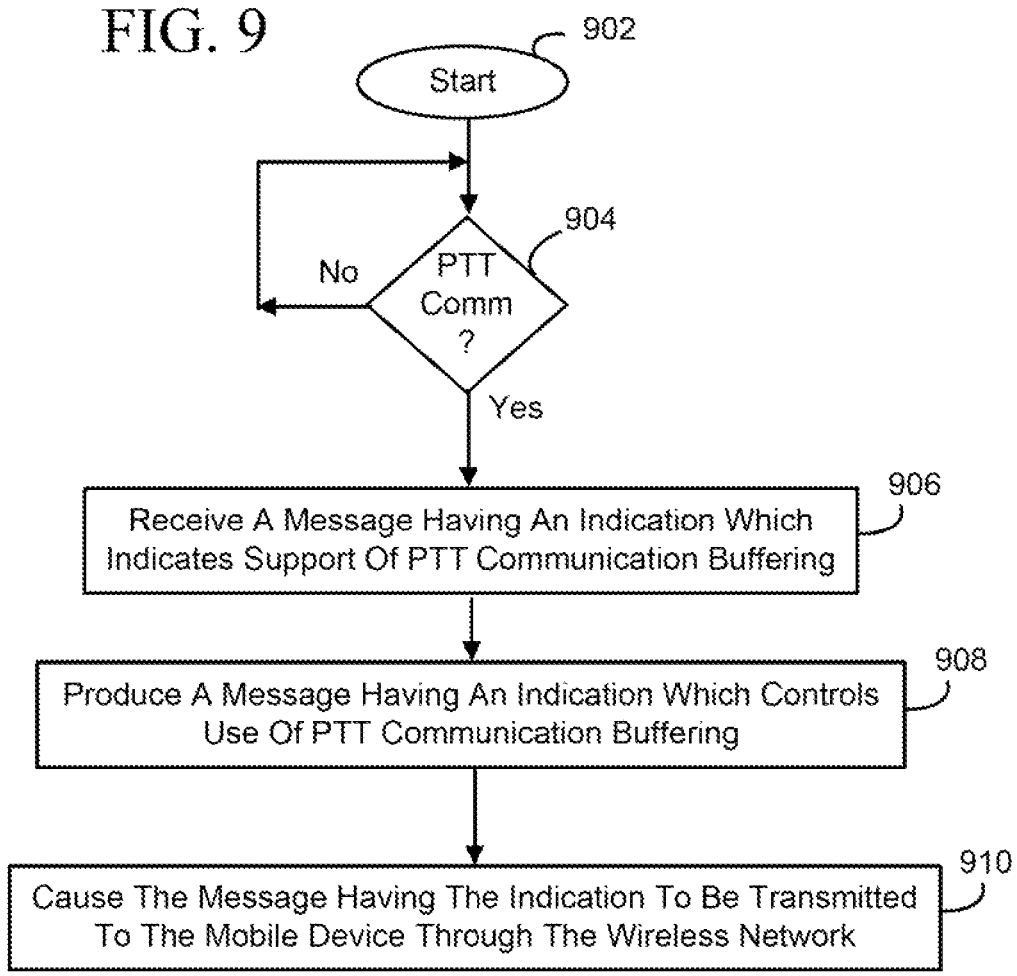

FIGS. 8 and 9 are flowcharts which describe methods of providing PTT buffering support indications from a mobile station and PTT buffering control of the mobile station by the wireless network. The method of FIG. 8 is performed by a mobile station within the context described above in relation to FIGS. 1-5, and the method of FIG. 9 is performed on the network side by a PTT service entity such as a PTT server or PoC server. In addition, the method may be embodied in a computer program product which includes a storage medium (e.g. computer disk or memory) and computer instructions stored in the storage medium. These computer instructions are performed by one or more processors of the mobile station (e.g. microprocessor, DSP, etc.).

Note that, in the embodiments described in relation to FIGS. 8 and 9, PTT buffering support may also available in the network (e.g. at a PTT service entity or server) and may or may not be available in the mobile station. If the PTT buffering support is available in the mobile station, the mobile station includes a FIFO buffer memory as described earlier above. Note also that the method may relate to PTT voice communications or any suitable PTT media type, such as video, or video plus audio (e.g. for videoconferencing), etc.

The discussion begins with FIG. 8 which is the method from the perspective of the mobile station. Beginning at a start block 802 of FIG. 8, a processor of the mobile station detects whether a PTT request is being made through the user interface by the end user (step 804 of FIG. 8). In one simple approach, the processor monitors for whether the PTT switch of the mobile station is actuated. Next, the processor produces a mobile device indication message which indicates support of the buffering of a PTT communication with use of the buffer memory of the mobile station (step 806 of FIG. 8). This message may be any suitable message, such as a SIP message, or specifically a SIP INVITE request, a SIP REFER request, or another SIP request. The indication may be delivered in a SIP header, included in SDP (Session Description Protocol) or XML (Extensible Markup Language) content in the body of the SIP message, or any combination of these mechanisms. The indication may be included in a Floor Request, Talk Burst Request message, or other Floor Control protocol or Talkburst Control message. The Floor Request or Talk Burst Request message may be transported using RTCP as specified in RFC 1889 or RFC 3550, or may be transported using another suitable protocol.

Next, the processor causes the mobile device indication message to be transmitted to a PTT service entity (e.g. PTT server) through the wireless communication network (step 808 of FIG. 8). The PTT service entity, which may provide PTT buffering but on the network side, receives this message for use in determining the PTT buffering requirement at the mobile station and providing control over the mobile station's use of PTT buffering during PTT communications. The PTT service entity may make the determination of the PTT buffering for the mobile station based on any suitable data and requirements. After sending the message and indication to the PTT service entity, the processor of the mobile station receives, via the wireless transceiver, a network indication message which controls use of the buffering for the PTT communication (step 810 of FIG. 8). This message may be any suitable message such as SIP message, specifically a SIP 200 OK, SIP 202 Accepted, or other SIP Response, or a SIP NOTIFY request or another SIP request or response. The indication may be delivered in a SIP header, included in SDP (Session Description Protocol) or XML (Extensible Markup Language) content in the body of the SIP message, or any combination of these mechanism. The indication may be included in a Floor Grantor Talk Burst Grant message, another Floor Control protocol, or Talkburst Control message. The Floor Grant or Talk Burst Grant message may be transported using RTCP as specified in RFC 1889 or RFC 3550, or may be transported using another suitable protocol. Next, the processor utilizes the buffer memory for the buffering of the PTT communication based on or in accordance with the network indication message from the PTT service entity (step 812 of FIG. 8). Note that steps 806, 808, 810, and 812 may be repeated for each initial PTT communication requiring buffering, and/or for real-time control of PTT buffering at the mobile station.

The discussion continues with FIG. 9 which is the general method from the perspective of the network or PTT service entity, which compliments the mobile station steps in the flowchart of FIG. 8. Beginning at a start block 982 of FIG. 9, a processor of the PTT service entity detects whether a PTT request is being made from a mobile station (step 904 of FIG. 9). Next, the processor receives a mobile device indication message which indicates support of the buffering of a PTT communication with use of the buffer memory of the mobile station (step 906 of FIG. 9). This message may be any suitable message, such as a SIP message, specifically a SIP INVITE request, a SIP REFER request, or another SIP request. The indication may be delivered in a SIP header, included in SDP (Session Description Protocol) or XML (Extensible Markup Language) content in the body of the SIP message, or any combination of these mechanisms. The indication may be included in a Floor Request, Talk Burst Request message, or other Floor Control protocol or Talkburst Control message. The Floor Request or Talk Burst Request message may be transported using RTCP as specified in RFC 1889 or RFC 3550, or may be transported using another suitable protocol.

The PTT service entity, which also provides PTT buffering but on the network side, receives this message for use in determining the PTT buffering requirement at the mobile station and providing control over the mobile station's use of PTT buffering during PTT communications. The PTT service entity may make the determination of the PTT buffering for the mobile station based on any suitable data and requirements. Thus, the processor produces a network indication message which controls use of PTT communication buffering at the mobile station (step 908 of FIG. 9). This message may be any suitable message, such as a SIP message, specifically a SIP 200 OK, SIP 202 Accepted, or other SIP Response or SIP NOTIFY request, or another SIP request or response. The indication may be delivered in a SIP header, included in SDP (Session Description Protocol) or XML (Extensible Markup Language) content in the body of the SIP message, or any combination of these mechanisms. The indication may be included in a Floor Grantor Talk Burst Grant message, or other Floor Control protocol or Talkburst Control message. The Floor Grant or Talk Burst Grant message may be transported using RTCP as specified in RFC 1889 or RFC 3550, or may be transported using another suitable protocol. The processor then causes this network indication message to be transmitted to the mobile station through the wireless communication network (step 910 of FIG. 9). The mobile station operates its PTT buffering, if at all, based on or in accordance with the network indication message. Note that steps 906, 908, and 910 may be repeated for each initial PTT communication requiring buffering, and/or for real-time control of and updates for PTT buffering at the mobile station.

The message from the mobile station (e.g. steps 806 and 906) may include something as simple as a bit flag ('0' or '1') which directly indicates whether or not the mobile station has PTT buffering capabilities. Alternatively, the mobile device indication message may include PTT buffer control data which indirectly indicates or implies the mobile station's support for PTT buffering. The mobile device indication message may further indicate a buffer size of the buffer memory used for the buffering of the PTT communication. This type of indication may be indicative of the maximum buffer size, the available buffer size, the remaining buffer size, or the utilized buffer size. The buffer size may be in the form of a threshold value. Note that the mobile station may allocate the buffer memory into different sections for different media types that may be supported (e.g. voice only, video, video+ audio, other streaming media). Thus, the mobile station may have different available or maximum buffer sizes assigned for and associated with different media types. For example, the mobile communication device may have a first buffer size of the buffer memory for a first media type (e.g. PTT voice) and a second buffer size of the buffer memory for a second media type (e.g. PTT video), and the message to the PTT service entity will further indicate one of the first buffer size and the second buffer size which may be used for the buffering of the PTT communication. As the steps in the methods may repeat for real-time updates, one or more subsequent messages may be produced and transmitted by the mobile station which indicate an updated buffer size available for use for any given media type.

Alternatively the indication of support for buffering by the mobile terminal may be communicated to the network using a provisioning and interrogation mechanism. Further, permission to perform buffering may be communicated to the network using a provisioning and interrogation mechanism. This may be done prior to the PTT switch being pressed, but not limited thereto. This may be by using a SIP message such as a SIP INVITE request or another SIP request that is used to establish a Pre-established Session and associated SIP Responses. The indication may be delivered in a SIP header or included in Session Description Protocol (SDP) or XML (Extensible Markup Language) content in the body of the SIP message or combinations of these mechanisms. The indication could also be transported to the network by a SIP REGISTER request using a feature tag using the Callee Capabilities mechanism as defined in RFC 3840 or encoded in the body of the SIP REGISTER request. Permission granted may be transported in the SIP response to the REGISTER request or via the SIP NOTIFY request, or SIP PUBLISH request or SIP INFO request or some other SIP message. The indication could also be transported using OMA Device Management management messages, or WAP Client Provisioning messages.

Again, the message from the mobile station (e.g. steps 806 and) 906) may be, or be formatted, or be included within, any suitable message. The indication may be included within a pre-existing message or a message created specifically for PTT buffering control activities. Preferably, the mobile device indication message is part of a Session Description Protocol (SDP) message or a Session Initiation Protocol (SIP) message (most preferably, SIP header message). Other suitable message alternatives include system overhead messages, SIP Signaling Messages, SDP parameters in SIP Signaling Messages, SIP headers in SIP Signaling Messages, XML body or other data encoding in the body of SIP Signaling Messages, SIP INVITE Request messages, SIP REFER Request messages, SIP PUBLISH Request messages, SIP REGISTER Request messages, SIP Request message using a feature tag as defined in Callee Capabilities (mechanism in RFC 3840), SIP UPDATE Request messages, SIP MESSAGE Request messages, SIP NOTIFY Request messages, SIP PRACK Request messages, SIP INFO Request messages, SIP Response to any SIP Request messages, OMA Device Management management messages, WAP Client Provisioning Messages, any Talk Burst Control or Floor Control messages, Talk Burst Request or Floor Request messages, and any provisioning messages.

The message from the network or PTT service entity (e.g. steps 810 and 908) may include something as simple as a bit flag ('0' or '1') which directly instructs whether or not the mobile station will perform PTT buffering for PTT communication. Alternatively, the network indication message may include PTT buffer control data which indirectly instructs or controls the mobile station's use of PTT buffering. The network indication message may further indicate a buffer size of the buffer memory to be used for the buffering of the PTT communication. This type of indication may be indicative of the maximum buffer size to be used (e.g. note that for size allocation purposes in the mobile station, actual size to be used may be pending for further indication but would not exceed the indicated maximum size), the actual buffer size to be used (e.g. note that when the indicated remaining buffer size is reached, the mobile station will begin to transmit buffered media data), the remaining buffer size (e.g. note that when the indicated remaining buffer size is reached, the mobile station starts to transmit buffered media data), or a relative buffer size (e.g. a percentage value of utilized/remaining buffer size relative to total size). The buffer size may be in the form of a threshold value. Note that the mobile station may allocate the buffer memory into different sections for different media types that may be supported (e.g. voice only, video, video+audio, other streaming media). Thus, the mobile station may have different available or maximum buffer sizes assigned for and associated with different media types. For example, the mobile communication device may have a first buffer size of the buffer memory for a first media type (e.g. PTT voice) and a second buffer size of the buffer memory for a second media type (e.g. PTT video), and the message to the mobile station from the PTT service entity will further indicate one of the first buffer size and the second buffer size to be used for the buffering of the PTT communication. As the steps in the methods may repeat for real-time updates, one or more subsequent messages r may be produced and transmitted by the mobile station (whether autonomously or in response to a request by the PTT service entity) which indicate an updated buffer size available for use for any given media type; one or more subsequent messages may be produced and transmitted by the PTT service entity to indicate updated use for the buffers, such as updated threshold values for starting transmission of buffered data for any given media type.

Again, the message from the PTT service entity (e.g. steps 810 and 908) may be, or be formatted, or be included within, any suitable message. The indication may be included within a pre-existing message or a message created specifically for PTT buffering control activities. Suitable messages may be, as examples, SIP Signaling Messages, SDP parameters in SIP Signaling Messages, SIP header in SIP Signaling Messages, XML body or other data encoding in the body of SIP Signaling Messages, SIP INVITE Request messages, SIP PUBLISH Request messages, SIP Request message using Callee Capabilities (mechanism in RFC 3840), SIP Request message using Caller Preferences (mechanism in RFC 3841), any Talk Burst Control or Floor Control messages, SIP UPDATE Request messages, SIP MESSAGE Request messages, SIP NOTIFY Request messages, SIP PRACK Request messages, SIP INFO Request messages, SIP Response to any SIP Request messages, OMA Device Management management messages, WAP Client Provisioning Messages, Talk Burst Grant or Floor Grant messages, any provisioning messages.

As described above, the PTT service entity may make a determination of the PTT buffering requirement for the mobile station based on any suitable information and requirements. For example, the network may have prestored information which dictates the PTT buffering requirements. As another example, the network may determine and set the level of the PTT buffering of the mobile station based on availability of its own network buffer which serves a plurality of mobile stations operating in the wireless network. Further, the network may determine the PTT buffering requirements for the mobile station based on a PTT buffering mode of operation.

A mobile station may receive, through its transceiver, presence information associated with one or more other mobile stations from a presence server or PTT server. A current availability or capability indication of the other mobile station may be identified from the presence information. Thus, the mobile station may engage in PTT communication sessions with use of the current availability or capability indication of the other mobile stations. A current availability indication may indicate whether or not the other mobile station is present in the wireless communication network, or may alternatively be a manually-set availability indication of the mobile station (entered through its user interface by the end user, for example). Both availability indications may be provided. The capability indication may be a media capability indication of the mobile station, where it is indicated what media types are capable of being communicated and/or handled by the mobile station. Alternatively, for example, the capability indication may be an automatic answering indication of the mobile station for PTT communication sessions, where the mobile station automatically (without user intervention at the time of receipt of the initial PTT communication) answers the PTT call. As apparent, the PTT or presence server is adapted to provide presence information associated with mobile stations (including, for example, automatic answering indications of the mobile communication device for PTT communication sessions), and cause the capability indications to be transmitted to a mobile station through a wireless communication network for the PTT communication sessions.

In a preferred approach, the mobile station utilizes the current availability or capability indication to determine whether to buffer a PTT communication for the PTT communication session. In this case, the mobile station buffers the PTT communication based on determining that the PTT communication should be buffered, but otherwise refrains from buffering the PTT communication.

As described herein, a message from the PTT service entity may directly or indirectly instruct the mobile station to operate in one of a plurality of PTT buffering modes of operation. A few examples of PTT buffering modes will be described.

In the first PTT buffering mode of operation, the mobile station's buffer starts to buffer immediately after the PTT switch is pressed (or at least without first waiting for any response from the network or PTT service entity), and the mobile station starts to transmit the buffered data immediately after a floor grant is received. The mobile station may use presence information or other suitable mechanism to identify whether the called party or parties are available and likely to automatically answer the call. The buffered size reaches a maximum level at the time when the floor grant is received and stays at the maximum level until the PTT switch is released. At that time, the buffer only has read-out activity and no writing activity until the buffer is cleared. The network (or PTT service entity) buffer starts to buffer immediately after starting to receive data from mobile station for buffer writing activity. When the first user is connected to receive data, the network buffer starts to read data out for the first user; however the buffered data continues to increase until the final user is connected. At that point in time, the network buffer size reaches a maximum level and stays at the maximum until the mobile station ceases transmission. The network buffer has to accommodate the delay between time points of the transmitting user connection and the final user reached. A first PTT buffering mode operates to provide the shortest delay for each user in a group and the best transmitting user experience.

In the second PTT buffering mode of operation, the mobile station's buffer starts to buffer immediately after the PTT switch is pressed (or at least without first waiting for any response from the network or PTT service entity), but the mobile station does not immediately start to transmit the buffered data until it receives a Network Control indication which permits it to do so. The mobile station may use presence information or other suitable mechanism to identify whether the called party or parties are available and likely to automatically answer the call. The network (e.g. PTT service entity) will cause a traffic connection to be made to all mobile station of the group, and does not immediately begin transmitting data until one or more mobile station users are connected. At the time all users are connected (or connection time out), the network (e.g. PTT service entity) sends a Network Control indication to the transmitting mobile station for instruction to start transmission of the mobile station buffered data; the network relays this data to all the connected mobile stations of the group. The mobile station's buffer size reaches a maximum level at the beginning of transmission over the traffic channel and stays at the maximum level until the PTT switch is released. At that time, the buffer only has read-out activity and no writing activity until buffer is cleared. In principle, the network buffer has effectively zero size. The mobile station's buffer has to accommodate the delay between time points of the transmitting mobile station's pressing the PTT switch and the final user being reached by the network. Although this second PTT buffering mode saves network buffering, it is usually not as desirable because all the mobile stations of the group suffer a delay. This second PTT buffering mode operates to provide minimum network buffer use while maintaining the best transmitting user experience.

In the third PTT buffering mode of operation, the mobile station's buffer does not start to buffer immediately after the PTT switch is pressed, but the mobile station waits until it receives a network indication message instructing it to perform buffering, and does not immediately start to transmit the buffered data even after the traffic channel is established. After the traffic channel is setup, the mobile station continues to wait for the network to connect with at least one other user before starting to transmit buffered data, so that the network does not need to buffer data or buffer as much data as it would otherwise. Prior to transmitting buffered data, null data may be transmitted over the traffic channel. The same network indication message received may have set a criterion for the mobile device to start to transmit the buffered data when the criterion is met. For example, the network indication message may instruct the mobile device to start transmitting buffered data when the buffered data reaches a particular threshold (including buffer full level) or is buffered for a particular time duration. Alternatively, the received network indication message may indicate the mobile device to buffer data until a further instruction is received in a subsequent network indication message.

The network (e.g. PTT service entity) will cause a traffic connection to be made to all mobile stations of the group, during which the mobile device does not begin transmitting data. Until one or more mobile stations are connected, and the criterion indicated by the received network indication message is met or a subsequent network indication message is received from the network to instruct the transmitting mobile device to start transmission, the mobile station will begin to transmit the buffered data to the network. The network then relays this data to all the connected mobile stations of the group. The mobile station's buffer size reaches a maximum level at the beginning of the transmission over the traffic channel and stays at this maximum level until the PTT switch is released. At that time, the buffer only has read-out activity and no write activity until buffer is cleared. Note that the mobile station's buffer has to accommodate the delay between time points of the transmitting mobile station's receipt of a first network indication message instructing it to perform buffering and the transmitting mobile station starting to transmit buffered data. While the transmitting mobile device performs the buffering, whether or not the network also needs to perform buffering is dependent on the time needed for the criterion to be met and the time needed for the network to reach, one or more or all callees. Alternatively, it may be dependent on whether at the time the second network indication message is received to instruct to transmit the mobile buffered data, the network has reached all callees. If all callees have been reached at the time the criterion is met or the instruction is received to begin transmission, in principle, the network buffer can have effectively zero size. Otherwise, the network buffer has to accommodate the delay between time points of the transmitting mobile station's beginning transmission of the buffered data and the final user being reached by the network.

Modes of operation between the above-described modes that trade-off between connection delay and network buffer size may be utilized, and the trade-off can be dynamically determined by the network based on network buffer resource use levels as well as mobile station capabilities. In addition the network may perform additional buffering by informing the mobile terminal to transmit its buffered data when the network calculates that the mobile stations buffer is becoming full.

Note that a PTT session may define non-real time media to be transmitted concurrently with real time PTT media, such as a text document or a pre-recorded video. Such non-real time "attachments" may be separately floor-controlled and the use of the real-time buffer may be affected by the "attachment" transmission activities. As such, the network may either predetermine and configure the way of buffer use that is dependent on "attachment" activities (such as based on pre-configured time thresholds or buffer level thresholds), or real-time control the use of the buffer.

Figure 10:
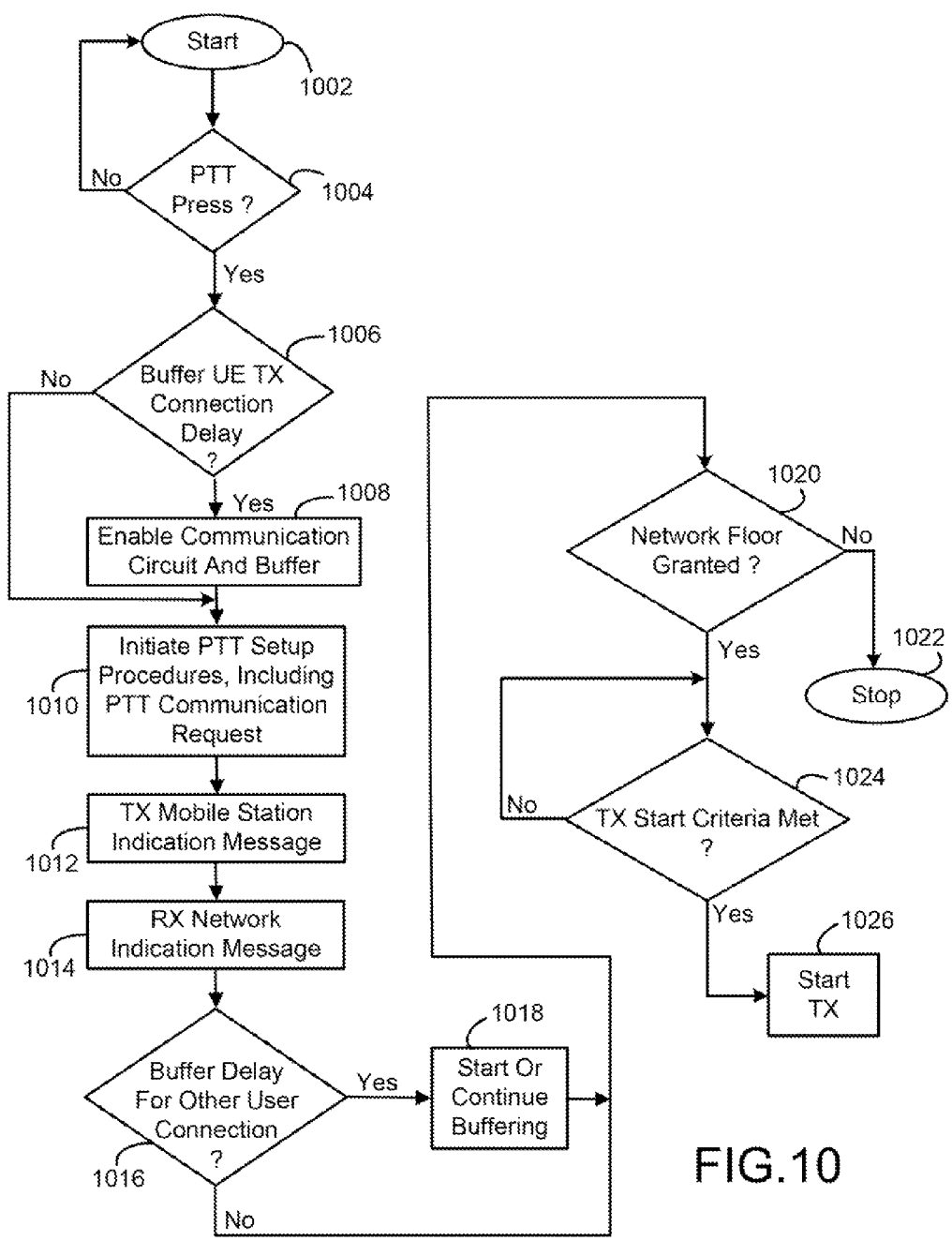
FIG. 10 is a flowchart for a mode of operation of a mobile station which buffers PTT communication data.

FIG. 10 is a flowchart for describing a mode of operation of a mobile station. The method may be embodied in a computer program product which includes a storage medium (e.g. computer disk or memory) and computer instructions stored in the storage medium. These computer instructions are performed by one or more processors of the mobile station (e.g. microprocessor, DSP, etc.). Note that although the method may relate to PTT voice communications, a PTT communication may involve any suitable PTT media type, such as video, or video plus audio (e.g. for videoconferencing), etc.

Beginning at a start block 1002 of FIG. 10, a processor of the mobile station detects whether a PTT request is being made through the user interface by the end user (step 1004 of FIG. 10). In one simple approach, the processor monitors for whether the PTT switch of the mobile station is actuated. Next, the processor identifies whether it is required to performing PTT buffering to accommodate a delay for transmission connection (step 1006 of FIG. 10). This requirement may or may not have been provided in an earlier received network indication message from the PTT service entity. This decision may be made based on either the requirements received from an earlier network indication message or a default or user preference setting, and may also utilize presence information or other suitable mechanism to identify the) likelihood that the callee(s) is available and to automatically answer the call.

If yes at step 1006, the processor will cause the communication circuits and buffering to be enabled for PTT buffering for this purpose (step 1008 of FIG. 10) so that buffering is performed immediately after the PTT switch is pressed or at least without first waiting for any response from the network. Note that a delay time period normally exists between the user actuation of the PTT switch and the network floor grant. In this case, however, the saving of the digital voice data in the FIFO buffer memory is performed at least in part during this delay time period. Put another way, at least some of the saving of the digital data is performed prior to identifying the network floor grant. Thus, the delay time period between the user actuation of the PTT switch and the receipt of input signals from the microphone is zero or nearly zero. Otherwise, if this step 1008 is skipped, and the caller waits for a response from the network prior to speaking.

The processor causes PTT setup procedures including a PTT communication request to be initiated by transmitting the appropriate messages to the network (step 1010 of FIG. 10). Also in particular, the processor causes a mobile device indication message to be sent to the PTT service entity through the wireless network using the mobile station's wireless transceiver (step 1012 of FIG. 10). The mobile device indication message indicates whether the mobile device supports further buffering for accommodating delays to connect to other users, in addition to what might have been performed in step 1008. In response, the processor receives through its wireless transceiver a network indication message from the PTT service entity (step 1014 of FIG. 10). Next, the processor identifies whether it is required to performing PTT buffering to accommodate one or more delays associated with all other user connections in the group (step 1016 of FIG. 10). This requirement may have been provided in the network indication message received in step 1014. If PTT buffering for this purpose is required, then the processor causes PTT buffering to be started if step 1008 was skipped or to be continued if step 1008 was performed (step 1018 of FIG. 10). If not, this step 1018 is skipped. In either case, the processor monitors whether a floor grant has been granted and received through its wireless transceiver (step 1020 of FIG. 10). If denied, then flowchart ends at step 1022 of FIG. 10. When the floor grant is received in step 1020, the processor monitors whether criteria is met to begin transmission of PTT buffered data (step 1024). For example, the criteria may be net once the PTT buffered data reaches the buffer size or a threshold provided, or once a subsequent network indication message is received which instructs the mobile device to start transmission. Once the criteria are met in step 1024, the processor causes the PTT buffered data to be transmitted to the wireless network (step 1026 of FIG. 10).

As described herein, a mobile communication device has one or more processors and a wireless transceiver adapted to provide communications through a wireless communication network. The one or more processors are operative to produce a mobile device indication message which indicates whether the mobile device supports buffering of Push-To-Talk (PTT) communications from the mobile device. This message is transmitted by the wireless transceiver to a PTT service entity through the wireless network. The one or more processors may be further operative to receive, from the PTT service entity through the wireless network, a network indication message which instructs the mobile device whether to use buffering for the PTT communications from the mobile device (assuming a buffer memory for PTT buffering is available in the mobile device). The mobile device may use the buffer memory for the buffering of the PTT communication based on the network indication message from the PTT service entity.

A Push-To-Talk (PTT) service entity (e.g. PTT server) of the present disclosure is adapted to produce a network indication message which controls use of a buffer memory of a communication device which is used for buffering a PTT communication from the communication device, and cause the network indication message to be transmitted to the communication device through a wireless communication network. Prior to transmission of this control message, a mobile device indication message which indicates support of the buffering of the PTT communication by the communication device may be received by the PTT service entity from the communication device through the wireless communication network.

A wireless communication system of the present disclosure includes a wireless communication network, a Push-To-Talk (PTT) service entity which communicates with the wireless communication network, and one or more communication devices. Each communication device is adapted to operate in the wireless communication network and includes one or more processors and a wireless transceiver coupled to the one or more processors and being adapted to provide communications through the wireless communication network. The one or more processors are operative to produce a mobile device indication message which indicates whether the communication device supports buffering of a PTT communication with use of a buffer memory, and cause the mobile device indication message to be transmitted by the wireless transceiver to the PTT service entity through the wireless communication network.

In another inventive aspect of the present disclosure, a method for use in providing Push-To-Talk (PTT) communications at a mobile communication device which operates in a wireless communication network includes the steps of receiving, through a wireless transceiver, presence information associated with at least one other mobile communication device from a presence server; identifying, from the presence information, a current availability or capability indication of the at least one other mobile communication device; and engaging in a PTT communication session through the wireless communication network with use of the current availability or capability indication. A current availability indication may indicate whether or not the mobile communication device is present in the wireless communication network, or may alternatively be a manually-set availability indication of the mobile communication device, or both indications may be provided. The capability indication may be an automatic answering indication of the mobile communication device for PTT communication sessions. Alternatively, the capability indication may be a media capability indication of the mobile communication device. In one approach, the mobile communication device utilizes the current availability or capability indication to determine whether to buffer a PTT communication for the PTT communication session. In this case, the mobile communication device buffers the PTT communication based on determining that the PTT communication should be buffered, but otherwise refrains from buffering the PTT communication. The mobile communication device may buffer the PTT communication, or the media, which is transmitted by the mobile station, prior to establishing communication with the other mobile station.

In another related aspect of the present disclosure, a Push-To-Talk (PTT) server which is adapted to provide presence information associated with mobile communication devices including automatic answering indications of the mobile communication device for PTT communication sessions, and cause the capability indications to be transmitted to a communication device through a wireless communication network for the PTT communication sessions. The PTT server may buffer the PTT communication, or the media, which is received from the mobile communication device, prior to establishing communication with the other mobile station.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method in a mobile communication device which is operative in a wireless communication network for Push-To-Talk (PTT) communications, the method comprising:
   receiving, at the mobile communication device, presence information associated with at least one other mobile communication device, the presence information including at least one of a current availability indication and a capability indication;
   buffering a PTT communication prior to its transmission from the mobile communication device based on the presence information if the at least one of the current availability indication and the capability indication has a first setting; and
   refraining from buffering the PTT communication prior to its transmission if the at least one of the current availability indication and the capability indication has a second setting.

2. The method of claim 1, wherein the at least one of the current availability indication and the capability indication is a current availability indication of the at least one other mobile communication device.

3. The method of claim 1, wherein the at least one of the current availability indication and the capability indication is a capability indication of the at least one other mobile communication device.

4. The method of claim 1, wherein the at least one of the current availability indication and the capability indication comprises a manually-set availability indication of the at least one other mobile communication device.

5. The method of claim 1, wherein the at least one of the current availability indication and the capability indication comprises an automatic answering indication of the at least one other mobile communication device.

6. The method of claim 1, wherein the at least one of the current availability indication and the capability indication comprises a media capability indication of the at least one other mobile communication device.

7. The method of claim 1, wherein the mobile communication device includes a buffer and a PTT switch, and the buffering of the PTT communication further comprises:
   identifying an actuation of the PTT switch for initiating the PTT communication;
   in response to identifying the actuation of the PTT switch:
      saving, in the buffer, digital data corresponding to input signals at the mobile communication device;
      making a request for the PTT communication via the wireless communication network;
      identifying an indication to transmit the PTT communication; and
      after identifying the indication to transmit the PTT communication, retrieving the digital data from the buffer and transmitting the digital data to the wireless communication network for the PTT communication.

8. The method of claim 1, which is embodied as computer instructions stored in a storage medium which are executable by one or more processors of the mobile communication device.

9. A mobile communication device, comprising:
   one or more processors;
   a wireless transceiver coupled to the one or more processors, the wireless transceiver being adapted to provide communications via a wireless communication network;

the one or more processors being operative to:
receive, via the wireless transceiver, presence information associated with at least one other mobile communication device, the presence information including at least one of a current availability indication and a capability indication; and
buffer a PTT communication prior to its transmission from the mobile communication device based on the presence information if the at least one of the current availability indication and the capability indication has a first setting; and
refrain from buffering the PTT communication prior to its transmission if the at least one of the current availability indication and the capability indication had a second setting.

10. The mobile communication device of claim 9, wherein the at least one of the current availability indication and the capability indication comprises a current availability indication of the at least one other mobile communication device.

11. The mobile communication device of claim 9, wherein the at least one of the current availability indication and the capability indication comprises a capability indication of the at least one other mobile communication device.

12. The mobile communication device of claim 9, wherein the at least one of the current availability indication and the capability indication comprises a manually-set availability indication of the at least one other mobile communication device.

13. The mobile communication device of claim 9, wherein the at least one of the current availability indication and the capability indication comprises an automatic answering indication of the at least one other mobile communication device.

14. The mobile communication device of claim 9, wherein the at least one of the current availability indication and the capability indication comprises a media capability indication of the at least one other mobile communication device.

15. A method in a Push-To-Talk (PTT) service entity for use in facilitating a PTT communication session delivered via a wireless communication network, the method comprising:
sending, to a mobile communication device in the wireless communication network, presence information of at least one other mobile communication device, the presence information including at least one of a current availability indication and a capability indication; and
receiving a PTT communication from the mobile communication device, which was buffered at the mobile communication device prior to its transmission depending if the at least one of the current availability indication and the capability indication has a first setting and refrained from buffering the PTT communication prior to its transmission if the at at least one of the current availability indication and the capability indication has a second setting.

16. The method of claim 15, wherein the at least one of the current availability indication and the capability indication comprises a current availability indication of the at least one other mobile communication device.

17. The method of claim 15, wherein the at least one of the current availability indication and the capability indication comprises a capability indication of the at least one other mobile communication device.

18. The method of claim 15, wherein the at least one of the current availability indication and the capability indication comprises a manually-set availability indication of the at least one other mobile communication device.

* * * * *